United States Patent Office 3,219,641
Patented Nov. 23, 1965

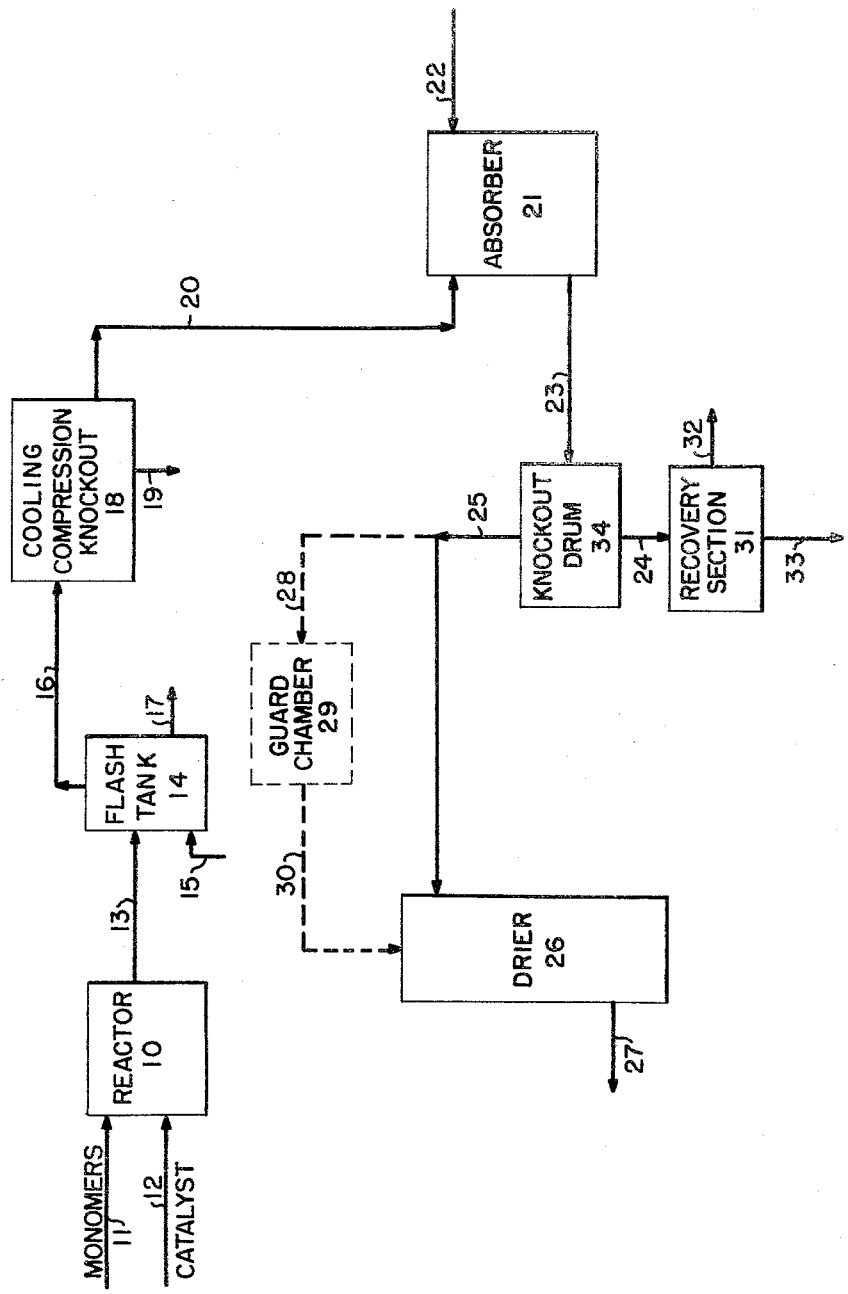

3,219,641
PROCESS FOR MODIFYING BUTYL RUBBER
Bruce R. Tegge, Madison, and Gilbert Rowe, Morristown, N.J., assignors to Esso Research and Engineering Company, a corporation of Delaware
Filed May 10, 1961, Ser. No. 109,097
10 Claims. (Cl. 260—80.7)

The present invention relates to an improved method of modifying isoolefin-multiolefin butyl rubber copolymers. More particularly, it deals with means for processing the recycle gas stream of a butyl rubber modification process so as to improve the operation of the recycle gas drying zone.

Butyl rubber is a well-known copolymer of about 85 to 99.5 wt. percent of a $C_4$ to $C_8$ isoolefin and 0.5 to 15 wt. percent of a $C_4$ to $C_{14}$ multiolefin. The isoolefin is preferably isobutylene but may be 2-methyl 1-butene, 4-methyl pentene-1, etc. The multiolefin is, in general, a $C_4$ to $C_6$ conjugated diolefin boiling below about 70° C., such as isoprene, butadiene, piperylene, dimethyl butadiene, etc. It has recently been suggested that butyl rubber-type copolymers be modified by the additional presence of a third monomer during polymerization. The third monomer is a multiolefin or vinyl aromatic boiling above 100° C. and is employed in amounts of 0.01 to 10 wt. percent preferably 0.1 to 1 wt. percent based on total polymer. Examples of such high boiling multiolefins and vinyl aromatics are divinylbenzene, alkyl-substituted divinylbenzene, dimethylallyl, styrene, alpha methylstyrene, myrcene, and vinyl fulvenes. The modification of conventional butyl rubber-type copolymers is described in U.S. Patents 2,671,073 and 2,781,334, among others.

The modification is simply made by including the third high boiling monomer in the feed to the reaction zone. The monomers, e.g., isobutylene, isoprene, divinylbenzene, preferably with 1 to 5 volumes of an inert diluent, normally a low boiling alkyl halide, such as methyl chloride or ethyl chloride, are cooled to a temperature between about 0° and —125° C. The cold mixture is polymerized by the addition of a Friedel Crafts catalyst, preferably an aluminum halide catalyst, in a liquid or a dissolved form. The amount of catalyst generally is about 0.02 to 0.5 wt. percent of the mixed olefins. The polymerization reaction is rapid and the polymer precipitates out of solution. The effluent from the reaction zone is then passed to a flask tank containing hot water. The hot water serves to vaporize inreacted hydrocarbon monomers, diluent, etc., which mixture comprises an overhead gas stream. This stream is conventionally thereafter cooled and compressed in one or more stages to remove the bulk of the vaporized water contained therein, and is thereafter subjected to a drying step to remove the relatively trace quantities of water still present in the stream. The drying step normally takes the form of an alumina bed drying operation, although glycol drying may be used in conjunction with, or in place of the alumina drier. After drying, the overhead stream is fractionated, principally to recover methyl chloride which is thereafter recycled to the reaction zone.

The modified butyl rubber copolymer, which is recovered from the flash tank and thereafter dried, has a viscosity average molecular weight of between about 200,000 to 2,000,000 and a mol percent unsaturation of about 0.5 to 15. As noted previously, it is composed of a major portion of the isoolefin monomer and minor portions of the normal multiolefin constituent and the high boiling, modifying monomer.

In the course of modifying butyl rubber-type copolymers by the above procedure, substantial difficulties have been experienced with the operation of the drying zone, e.g., alumina driers. Fouling and deactivation of alumina gel solids has occurred. The adsorptive ability and water holding capacity of the drying medium has also been reduced, due apparently to the polymerization and occlusion of the relatively trace quantities of high boiling monomer modifiers in the stream recovered after cooling and compression. This has resulted in the need for frequently regenerating and/or replacing the adsorptive material in the drying zone.

This problem is not encountered in the conventional butyl rubber operation since the monomers, predominantly isobutylene and small quantities of isoprene, are relatively low boiling. As a result, they are easily desorbed from the alumina gel by depressuring and evacuating the alumina drier bed prior to heat regeneration of the alumina. It is during this heating step that the high boiling reactive monomers employed in the present process polymerize on the alumina gel surface and thus destroy the adsorptive capacity of the alumina gel.

In accordance with the present invention, the drying step may be conducted in a relatively trouble-free manner and without the frequent replacement and/or regeneration of drying medium. More particularly, in accordance with the present invention, the recycle stream from a modified isoolefin-multiolefin process is, prior to being sent to the drying zone, subjected to a removal step for freeing the stream of trace quantities of multiolefin or vinyl aromatic monomers boiling above 100° C. The removal step preferably takes the form of a scrubbing operation employing a $C_6$ to $C_{20}$ organic liquid, preferably a $C_8$ to $C_{12}$ hydrocarbon, as the scrubbing medium. Normally about 0.01 to 0.20, preferably 0.02 to 0.06 lbs. of scrubbing oil are employed per lb. of overhead stream subjected to treatment. Scrubbing will usually take place at about 65 to 110° F. and 20 to 75 p.s.i.g. The scrubbed vapor stream, which is thereafter sent to the conventional drying step, will contain less than 1% of the heavy monomer present in it immediately prior to scrubbing. Examples of suitable scrubbing oils are the following: kerosenes, gas oils, Varsols, solvent naphthas, xylenes, Solvesso 100 and 150 ($C_9$ and $C_{10}$ aromatics), isooctane, isononanes, $C_8$ to $C_{10}$ alkylates, toluene, ethyl benzene., alkyl naphthenes, i.e., any $C_8$ to $C_{12}$ hydrocarbon fraction with low olefin content.

In a preferred embodiment a solid adsorption guard chamber is employed in conjunction with the scrubbing zone as a means for further removing the trace quantities of high boiling monomer from the stream which is to be passed to the alumina or glycol driers. This solid adsorption zone may contain clays such as attapulgas clay, bauxite, fuller's earth, molecular sieves such as 5 A. sieves, etc. Alternatively, the guard chamber may take the form of a small alumina-containing zone separate from the principal drying section, the alumina guard chamber being capable of periodically being dumped and refilled with fresh material. Thus the guard chamber can be emptied and refilled without the loss of production through the principal drying zone.

Although a less desirable operation, a solid adsorption zone containing solids other than employed in the drier section can be used in place of the scrubbing zone as a means of removing high boiling monomer modifiers. Solids such as clays, bauxite, etc. may be used for this purpose. This is substantially less desirable than the above-described scrubbing operation since adsorbent solids have only limited capacity for the high boiling monomers and, hence, the adsorbent in the guard chamber must be replaced periodically, e.g., every 2 to 10 days depending on the size of the guard chamber. It is much more economical to employ a small amount of scrubbing liquid which can be refined and reused at low cost.

It should be noted that the normal cooling and compression cycle treatments of the recycle gases are insufficient for removing trace quantities of monomers boiling above 100° C. which have been found to disrupt drying of the recycle gas stream. Fractionation cannot be employed to remove these high boiling monomers because of methyl chloride hydrate plugging problems in the fractionation towers and overhead condenser systems if the water is not removed by alumina or glycol drying prior to fractionation.

It should further be noted that the present steps for removing trace quantities of high boiling monomers used as modifiers is a distinct operation from the monomer drying step, e.g., alumina or glycol driers, used to remove final traces of water from the recycle gas stream prior to fractionating in order to recover reaction zone diluent, e.g., methyl chloride.

It is to be appreciated that the present process is applicable to modified multiolefin-isoolefin copolymers which employ one or more additional monomers in addition to the three component isoolefin-multiolefin and high boiling multiolefin monomer mixture described previously. Thus the present system may readily be used in the production of a tetrapolymer of, for example, isobutylene, isoprene, divinylbenzene, and cyclopentadiene.

The various aspects and modifications of the present invention will be made more clearly apparent by reference to the following description and accompanying examples.

For the purposes of illustrating the present invention, a system for modifying conventional isoolefin-multiolefin copolymers using minor proportions of divinylbenzene as the modifying agent will be described. However, it is to be clearly understood that the present invention is applicable to processes using various modifying, high boiling monomers for altering the characteristics of conventional butyl rubber.

A detailed material balance and analysis of the amounts of the various components found in the more important streams illustrated in the drawing is found in Table I.

Referring to the drawing, a reactor monomer feed containing a major portion of isobutylene and minor proportions if isoprene and divinylbenzene (in addition to minor quantities of ethylvinylbenzene and $C_{10}$ aromatics found in commercial divinylbenzene) is introduced into reactor 10 along with methyl chloride diluent by means of line 11. Approximately 2 lbs. of aluminum chloride in 2,000 lbs. of methyl chloride is also introduced into reactor 10 by means of line 12 per hour. Polymerization is effected at a temperature of −135° F. and a pressure of 10 p.s.i.g. The effluent of reaction zone 10 at a temperature of −135° F. is thereafter passed to flash tank 14. The reaction effluent is a mixture of solid polymer products (a polymer of isobutylene, isoprene and minor proportions of divinylbenzene) dispersed in methyl chloride along with unreacted monomer constituents. Within flash tank 14 there is maintained, by means of line 15, a reservoir of hot water at a temperature of about 160° F. Upon contact with the hot water in flash tank 14, the volatile portion of the reactor effluent, i.e., methyl chloride, and the unreacted monomers, are vaporized overhead and withdrawn through line 16 along with significant quantities of water vapor. The aqueous polymer solution thus formed in tank 14 is withdrawn through line 17 and passed to slurry finishing, drying and recovery of the polymer, as is conventional. Substantially all the catalyst is removed through line 17.

The overhead from flash tank 14 is thereafter subjected to one or more cycles of cooling, compression and knockout (enlarged zone provided for subsequent separation of condensed materials) which is schematically represented by zone 18 in the drawing. A typical operation would involve: (1) cooling the overhead stream in line 16 which is at a temperature of 150° F. and 3 p.s.i.g. to a temperature of 110° F., (2) allowing for the removal of condensed materials, (2) compressing it to 50 p.s.i.g. and thereafter cooling the uncondensed fractions to 70° F. The condensed materials are schematically shown as being removed through line 19. The bulk of both the water vapor and high boiling monomer modifier, i.e., divinylbenzene, are thus removed in zone 18. However, trace amounts of divinylbenzene, along with small quantities of water, are still present in the uncondensed effluent of zone 18 which is removed therefrom at 70° F. and 45 p.s.i.g. through line 20.

Prior to the practice of the present invention, the uncondensed stream in line 20, composed principally of methyl chloride, isobutylene and isoprene, was directly passed through drying zone 26 for removal of trace quantities of water vapor. This leads to fouling difficulties and reduced alumina drying capacities which the present invention serves to cure.

In accordance with the present invention, stream 20 is subjected to a high boiling monomer removal step prior to being circulated to the drying zone. In the present example, stream 20 is passed to absorber 21 which may take the form of a 2 foot diameter by 10 foot packed section. Within absorber 21 the recycle gas stream (16,000 lbs. per hour) is contacted at a temperature of 70° F. and a pressure of 45 p.s.i.g. with 400 lbs. per hour of a solvent material commercially known as "Varsol." Varsol is a $C_9$ to $C_{11}$ hydrocarbon mixture boiling in the range of 315 to 385° F. It is a highly refined virgin cut from a low sulfur paraffinic crude. It is principally used as a low cost hydrocarbon solvent in the dry cleaning and paint industries. Contact may occur concurrently, countercurrently, via multi-staging, or in any other manner desired. The resulting mixture of scrubbing liquid and gases is removed from the absorber 21 via line 23 and passed to knock-out drum 34 which may take the form of a 4 foot diameter by 8 foot drum. Within knock-out drum 34 a separation is achieved between the scrubbing liquid containing absorbed materials and the scrubbed gases which are removed through line 25. The scrubbed gases withdrawn overhead contain practically no high boiling monomer constituents. In the present example the content of divinylbenzene present in stream 20 is reduced from a value of 0.788 lb. per hour to a value of 0.003 lb. per hour in stream 25. Stream 24, which contains the stripping medium adsorbed high boiling monomers, together with some methyl chloride, isobutylene and isoprene, may be subjected to a recovery operation in section 31 so as to separate reactor feed components from the stripping medium. Recovery section 31 may take the form of a steam stripping zone, fractionator or heating zone, stripping medium being recovered through line 33 for subsequent use in absorber 21. Recovered materials withdrawn through line 32 may be discharged or, if desired, recirculated to reactor 10 after removal of water.

The scrubbed recycle stream withdrawn from the knockout drum is passed via line 25 to drier 26 wherein the stream is dried to remove the remainder of water vapor contained therein. This stream is nearly free of high boiling monomer constituents and, thus, does not cause difficulty in the drier zone. In the present example drier 26 contains a fixed bed of alumina gel in the form of a 6 foot diameter by 30 foot drum containing 25,000 lbs. of 4 to 8 mesh activated alumina gel. Drying zone 26 operates at a temperature of about 70° F. and 45 p.s.i.g. Dry gases, i.e., methyl chloride, isobutylene and isoprene, are then passed to a conventional fractionation step whereby the methyl chloride can be separated and recycled to the reaction zone If desired, either the isobutylene and/or isoprene may also be recovered in the subsequent fractionation step, as is conventional in the art.

The dotted line portions of the drawing illustrate an embodiment of the present invention wherein a guard chamber containing adsorptive solids is employed in addition to scrubbing zone 21. In this embodiment, the stream recovered from the scrubbing operation via line 25 is passed to guard chamber 29 by means of a conduit 28 in order to remove the extremely small quantities of high boiling monomer constituents which may be present therein. Guard chamber 29 may contain inexpensive clay or bauxite, or may be packed with a relatively small quantity (as compared with the drying zone) of alumina. The last traces of high boiling monomers are thus removed in the guard chamber and the resulting purified stream thereafter passed to the drying zone via line 30. However, the adsorptive material in guard chamber 29 must be periodically dumped and refilled with fresh alumina in order to remove any of the remaining small traces of high boiling monomers. During the replacement of the adsorptive material in the guard chamber, the recycle gas stream in lines 25 and 28 may bypass zone 29 and be sent directly to the drying step.

Table I sets forth a detailed material balance for the above-described system wherein the modified butyl rubber polymer contains 0.5 wt. percent divinylbenzene, 1.8 wt. percent isoprene and 97.7 wt. percent isobutylene. A reactor conversion of 80% is obtained with a 20 wt. percent polymer slurry concentration in the reaction zone. Total production of 4100 lbs. per hour of polymer is secured while using commercial divinylbenzene which is available as a 60 wt. percent concentrate with ethylvinylbenzene isomers.

4. In the proces of modifying a polymer of a major portion of a $C_4$ to $C_7$ isoolefin and a minor portion of a $C_4$ to $C_{14}$ multiolefin by reacting said olefins in a reaction zone, with at least one additional monomer boiling above 100° C. selected from the group consisting of multiolefins and vinyl aromatics, wherein the unreacted portion of the effluent of said reaction zone is volatilized, sent through a condensation zone, separated into a condensate and an uncondensed condensation zone effluent, the latter which is sent to an alumina drying zone, the improvement which comprises subjecting the uncondensed condensation zone effluent to contact with a $C_6$–$C_{20}$ hydrocarbon scrubbing oil prior to passing said uncondensed volatilized effluent to said alumina drying zone.

5. The improved process of claim 4 wherein between about 0.01 and about 10 wt. percent additional monomer boiling above 100° C., based on total polymer, is employed.

6. The improved process of claim 4 wherein the additional monomer boiling above 100° C. is selected from the group consisting of divinylbenzene, dimethallyl and styrene.

7. In the process of modifying a polymer of a major portion of a $C_4$ to $C_7$ isoolefin and a minor portion of a $C_4$ to $C_{14}$ multiolefin by reacting said olefins in a reaction zone with at least one additional monomer boiling about 100° C. selected from the group consisting of multiolefins and vinyl aromatics, wherein the unreacted portion of the effluent of said reaction zone is volatilized, sent through a condensation zone, separated into a condensate and an uncondensed condensation zone effluent, the latter of which is sent to a drying zone, the improvement which comprises, in combination, the steps of subjecting the uncondensed condensation zone effluent to contact with a $C_6$–$C_{20}$ hydrocarbon scurbbing oil and transmitting the scrubbed, uncondensed condensation zone effluent through

*Table I*

| Stream in lines | 11 and 12 | 16 | 20 | 24 | 25 | 27 |
|---|---|---|---|---|---|---|
| Component, lbs./hr.: | | | | | | |
| Methyl chloride | 15,000 | 15,000 | 14,970 | 708 | 14,262 | 14,262 |
| Isobutylene | 5,000 | 1,000 | 997 | 87 | 910 | 910 |
| Isoprene | 125 | 50 | 49 | 16 | 33 | 33 |
| Divinylbenzene | 25 | 12 | 0.788 | 0.785 | 0.003 | |
| Ethylvinylbenzenes | 15 | | | | | |
| Varsol (325–375° F.) | | | | 394 | 6 | 1 |
| Water | | 1,510 | 35 | 1 | 34 | 0.1 |
| Total | 20,165 | 17,572 | 16,051.788 | 1,206.785 | 15,245.003 | 15,206.1 |

Having described the present invention, that which is sought to be protected is set forth in the following claims.

What is claimed is:

1. In the process of modifying a polymer of a major portion of a $C_4$ to $C_7$ isoolefin and a minor portion of a $C_4$ to $C_{14}$ multiolefin by reacting said olefins in a reaction zone, with at least one additional monomer boiling above 100° C. selected from the group consisting of muliolefins and vinyl aromatics, wherein the unreacted portion of the effluent of said reaction zone is volatilized, seat through a condensation zone, separated into a condensate and an uncondensed condensation zone effluent, the latter of which is sent to a drying zone, the improvement which comprises subjecting the uncondensed condensation zone effluent to contact with a $C_6$–$C_{20}$ hydrocarbon scrubbing oil prior to passing said uncondensed volatilized effluent to said drying zone.

2. The improvement of claim 1 wherein the hydrocarbon scrubbing oil is a $C_9$–$C_{11}$ hydrocarbon mixture boiling in the range of between about 315° F. and about 385° F.

3. The improved process of claim 1 wherein said additional monomer boiling above 100° C. is selected from the group consisting of divinylbenzene, dimethallyl, and styrene.

a solid absorption zone containing a material selected from the group consisting of attapulgas, clay, bauxite, fuller's earth, almuina and molecular sieves, prior to passing said uncondensed volatilized effluent to said drying zone.

8. In the process of modifying a polymer of 85–99.5 wt. percent of isobutylene and 0.5 to 15 wt. percent of isoprene by reacting said olefins in a reaction zone with between about 0.01 and about 10 wt. percent of at least one additional monomer boiling above 100° C. selected from the group consisting of multiolefins and vinyl aromatics, wherein the effluent of said reaction zone is contacted with hot water in order to volatilize the unreacted portion of the reaction zone effluent and wherein the volatilized unreacted portion of the reaction zone effluent is sent through a condensation zone, separated into a condensate and an uncondensed condensation zone effluent, the latter of which is sent to an alumina drying zone, the improvement which comprises subjecting the uncondensed condensation zone effluent to contact with a $C_6$–$C_{20}$ hydrocarbon scrubbing oil prior to passing said uncondensed condensation zone effluent to said alumina drying zone.

9. The improved process of claim 8 wherein said additional monomer boiling above 100° C is divinylbenzene.

10. The improved process of claim 4 wherein the contacting with the $C_6$–$C_{20}$ hydrocarbon scrubbing oil is cocurrent.

References Cited by the Examiner
UNITED STATES PATENTS

| | | | |
|---|---|---|---|
| 2,227,808 | 1/1941 | Dreisback | 260—669 |
| 2,537,130 | 1/1951 | Green | 260—85.1 |
| 2,818,137 | 12/1957 | Richmond et al. | 260—676 |
| 2,833,750 | 5/1958 | Vickers | 260—85.1 |
| 2,899,474 | 8/1959 | Ricards | 260—676 |
| 2,920,113 | 1/1960 | Pollock et al. | 260—85.1 |
| 2,956,015 | 10/1960 | Hann | 260—676 |
| 3,008,942 | 11/1961 | Friedlander | 260—935 |
| 3,024,867 | 3/1962 | Milton | 260—676 |
| 3,094,569 | 6/1963 | Thomas | 260—676 |

OTHER REFERENCES

Vlodavets et al.: 50 C.A.12352d, 1956.

JOSEPH L. SCHOFER, *Primary Examiner.*

MORRIS LIEBMAN, WILLIAM H. SHORT, LEON J. BERCOVITZ, *Examiners.*